United States Patent
Oshima et al.

(10) Patent No.: US 6,959,780 B2
(45) Date of Patent: Nov. 1, 2005

(54) VIBRATION DAMPING SYSTEM FOR AN ENGINE MOUNTED ON A VEHICLE

(75) Inventors: Hiroshi Oshima, Sakai (JP); Masashi Osuga, Sakai (JP); Yoshio Tomiyama, Sakai (JP); Hiroshi Kawabata, Sakai (JP)

(73) Assignee: Kubota Corporation, Osaka (JP)

( * ) Notice: Subject to any disclaimer, the term of this patent is extended or adjusted under 35 U.S.C. 154(b) by 107 days.

(21) Appl. No.: 10/377,408

(22) Filed: Feb. 28, 2003

(65) Prior Publication Data

US 2004/0020702 A1 Feb. 5, 2004

(30) Foreign Application Priority Data

Jul. 30, 2002 (JP) ........................................ 2002-221685

(51) Int. Cl.[7] .................................................. B60K 8/00
(52) U.S. Cl. ...................... 180/299; 180/300; 123/192.2
(58) Field of Search ................................ 180/291, 297, 180/299, 300, 312; 123/192.1, 192.2

(56) References Cited

U.S. PATENT DOCUMENTS

| | | | | |
|---|---|---|---|---|
| 3,457,804 A | * | 7/1969 | Harkness ...................... | 74/604 |
| 3,643,636 A | * | 2/1972 | Miley et al. ............. | 123/41.69 |
| 4,481,918 A | * | 11/1984 | Morton ..................... | 123/192.2 |
| 4,537,275 A | * | 8/1985 | Kimura et al. .............. | 180/300 |
| 4,628,876 A | * | 12/1986 | Fujikawa et al. ......... | 123/192.2 |
| 4,641,732 A | * | 2/1987 | Andry ......................... | 188/379 |
| 4,656,981 A | * | 4/1987 | Murata et al. ........... | 123/192.2 |
| 4,800,852 A | * | 1/1989 | Kandler .................... | 123/192.2 |
| 4,819,593 A | * | 4/1989 | Bruener et al. .......... | 123/192.2 |
| 4,901,814 A | * | 2/1990 | von Broock et al. ....... | 180/297 |
| 5,218,885 A | * | 6/1993 | Nakano et al. ............... | 74/591 |
| 5,375,821 A | * | 12/1994 | Toshimitsu et al. .... | 267/140.12 |
| 5,947,074 A | * | 9/1999 | Yapici ..................... | 123/192.2 |
| 6,374,939 B1 | * | 4/2002 | Hohnstadt et al. .......... | 180/299 |
| 6,508,343 B2 | * | 1/2003 | Misaji et al. ............... | 188/379 |

\* cited by examiner

*Primary Examiner*—Christopher P. Ellis
*Assistant Examiner*—Kelly E Campbell
(74) *Attorney, Agent, or Firm*—The Webb Law Firm

(57) ABSTRACT

A vibration damping system for an engine mounted on a vehicle has mounting elements attached to frames of the vehicle, through which elements the engine is mounted on the frames, a damping weight provided outwardly of the engine, and a weight support unit fixed at one end thereof to the engine and having the damping weight attached at the other end thereof. The weight support unit includes a first arm extending along one lateral side of a vertical plane extending through an axis of a crankshaft and a second arm extending along the other lateral side of the vertical plane. The damping weight is attached to free ends of the arms. The damping weight is positioned above the cylinder head of the engine to extend transversely of the vertical plane.

12 Claims, 10 Drawing Sheets

VIBRATION DAMPING SYSTEM FOR AN ENGINE MOUNTED ON A VEHICLE

BACKGROUND OF THE INVENTION

1. Field of the Invention

The present invention relates to a vibration damping system for an engine mounted on a vehicle.

2. Description of the Related Art

An engine is conventionally mounted on vehicle frames through mounting elements including rubber cushions or the like as components, thereby to restrain vibrations from being transmitted from the engine to the frames. Various constructions and arrangements of the mounting elements for absorbing the vibrations have been proposed, and one example thereof is disclosed in U.S. Pat. No. 6,374,939.

The mounting elements employed in the U.S. patent may, with some effect, restrain engine vibrations from being transmitted to the frames. However, such a construction does not positively restrict the vibrations of the engine per se, and thus has no effect for restraining airborne noise produced by the engine vibrations. Thus, some specific design is required to restrict the vibrations of the engine per se in order to restrain such noise. To this end, active damping systems have begun to be proposed, but such systems still have a serious problem of large-scale construction and control as well as increased cost.

Further, the vibrations of the engine per se could be increased depending on the elasticity of the mounting elements, and also the damping effect achieved by the mounting elements is limited. Especially, with a diesel engine having a small number of cylinders mounted on a small vehicle such as an agricultural tractor, it has been difficult to restrain engine vibrations and resulting noise generation solely by the mounting elements.

SUMMARY OF THE INVENTION

The present invention has been made having regard to the state of the art noted above, and its object is to provide a vibration damping system capable of effectively reducing vibrations of the engine per se to realize a comfortable ride and reduced noise even with a vehicle having a diesel engine with a small number of cylinders.

In order to achieve the above-noted object, the present invention proposes a vibration damping system for an engine mounted on a vehicle, whose essential aspect is not only to simply mount the engine on frames through mounting elements but also to provide a damping weight for the engine for restraining engine vibration thereby to reduce the engine vibration per se.

For instance, the engine is mounted on the vehicle frames through the mounting elements with a cylinder head facing upward and a crankcase facing downward, and the damping weight is supported to be adjacent the cylinder head. With this arrangement, the center of mass and gravity of the engine may be adjusted by the damping weight, as a result of which inertia and the moment of inertia may be varied thereby to restrain the engine vibrations per se. The restrained vibrations are effectively absorbed by the mounting elements when transmitted to the vehicle frames.

In a preferred embodiment of the present invention, the damping weight is supported by a weight support unit fixed at one end thereof to the crankcase of the engine. With this construction, the damping weight is maintained by the crankcase of the engine through the weight support unit. The crankcase has a stout construction compared with the cylinder head or an oil pan, and further has little possibility of causing oil leakage. As a result, the system has little chance of adversely affecting the engine, but maintains the damping weight reliably to allow the damping weight to fully perform its functions for an extended period of time.

In a further preferred embodiment of the present invention, the weight support unit includes brackets for the mounting elements. With this construction, the weight support unit for maintaining the damping weight acts also as the brackets for receiving the mounting elements for mounting the engine on the vehicle body. This realizes a simplified construction and reduced cost by reducing the number of parts.

In a still further preferred embodiment of the present invention, the weight support unit includes a first arm extending along one lateral side of the cylinder head and a second arm extending along the other lateral side of the cylinder head, and the damping weight is maintained above the cylinder head by these arms. With this construction, the damping weight is maintained stably at the opposite lateral sides thereof above the cylinder head by the first and second arms extending upward from the crankcase along the opposite lateral sides of the cylinder, respectively. In addition, the damping weight is maintained above the cylinder head and thus can restrain the engine vibrations per se with increased effect.

Further, the present invention proposes to arrange the damping weight so that the center of gravity of the weight may be positioned at or adjacent a vertical plane extending through an axis of the crankshaft. With this arrangement, the damping weight effectively acts against a vibration generating force primarily caused by explosions in the engine, thereby to effectively restrain the engine vibrations per se in a balanced manner.

Other features and advantages of the present invention will be apparent from the following description of the preferred embodiments to be taken with reference to the accompanying drawings.

DESCRIPTION OF THE PREFERRED EMBODIMENTS

A vibration damping system according to the present invention will be described hereinafter with reference to the drawings.

Figure 1:
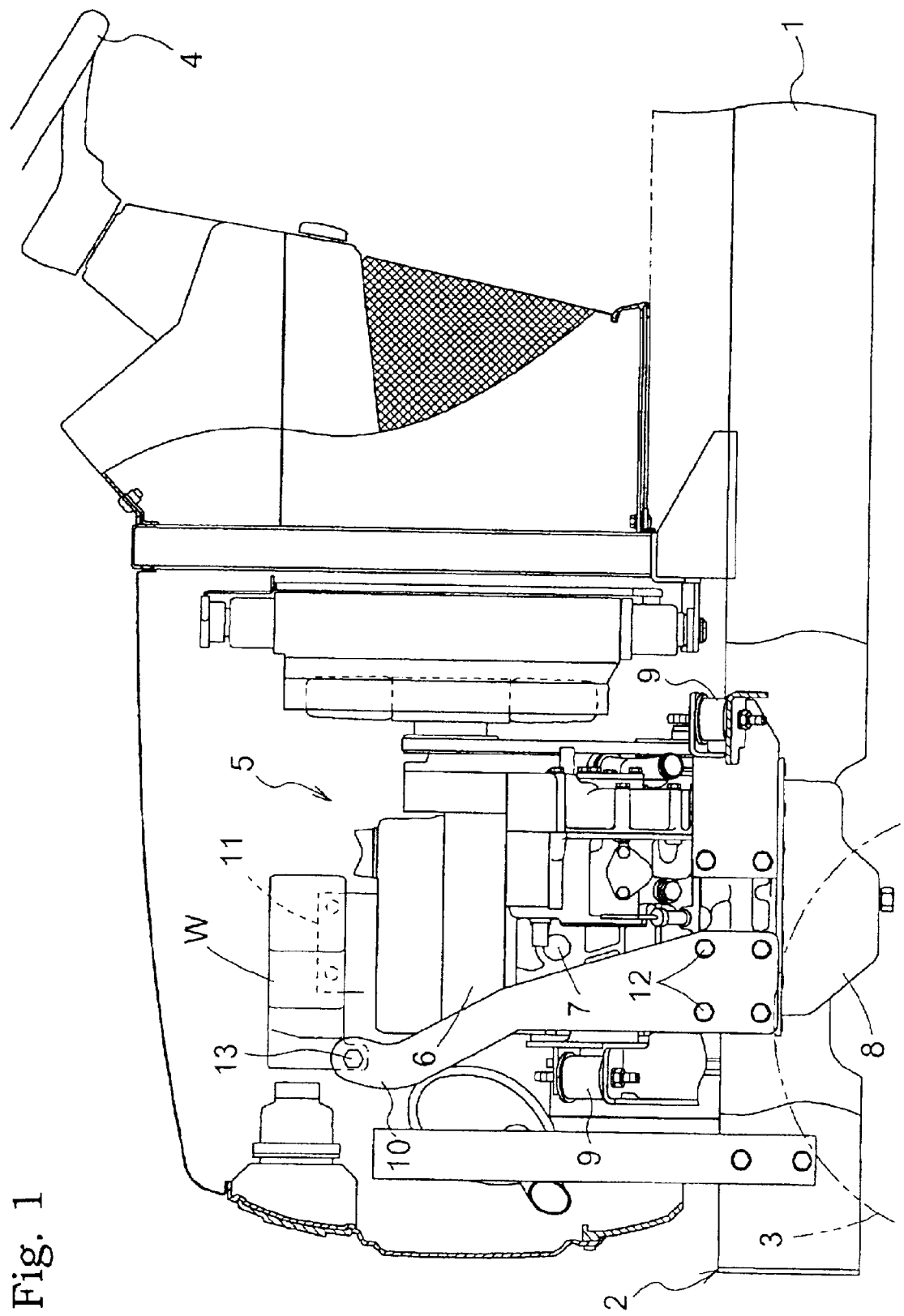
FIG. 1 is a side view of a principal portion of an agricultural tractor according to a first embodiment.
Figure 2:
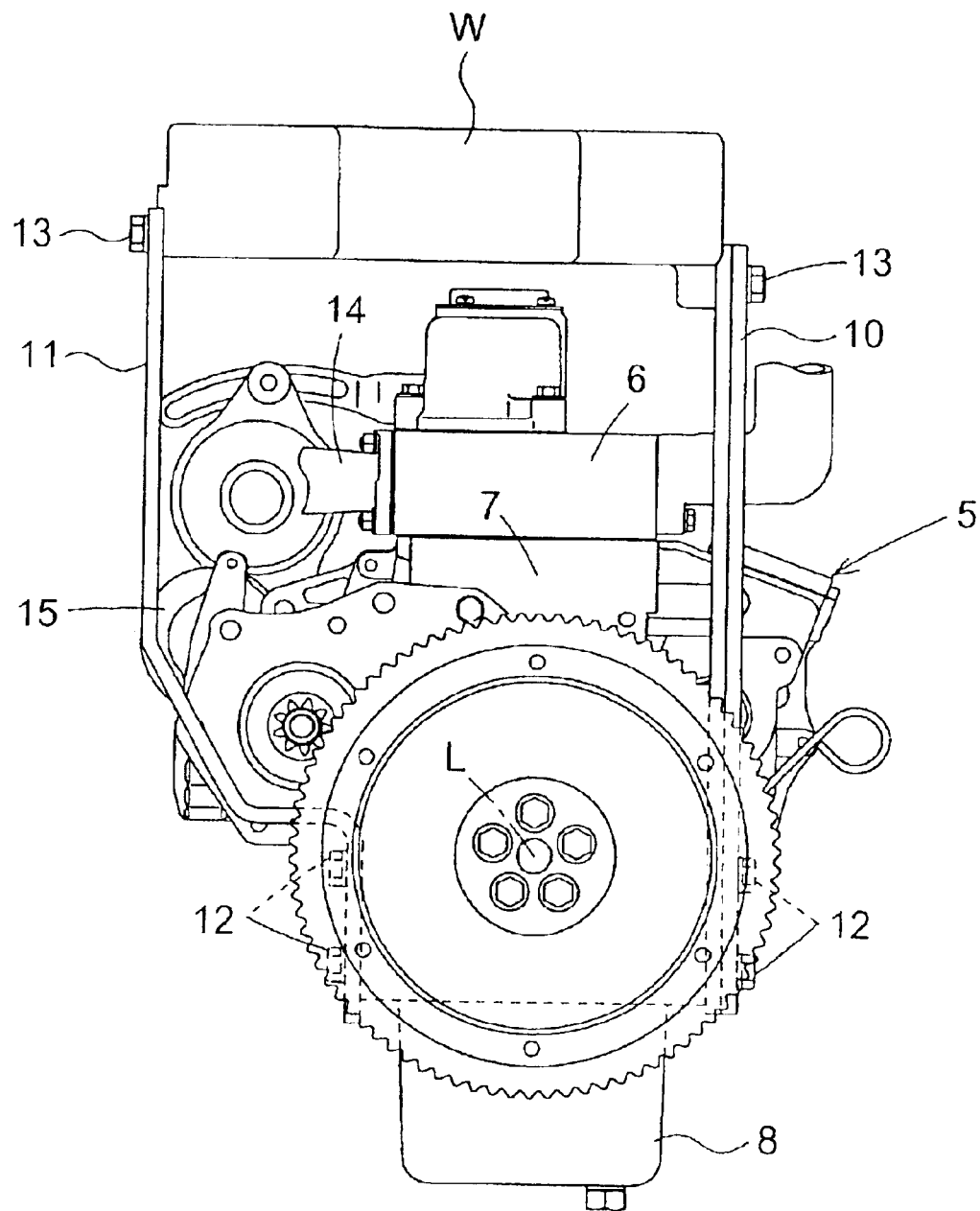
FIG. 2 is a front view of an engine mounting structure according to the first embodiment.
Figure 3:
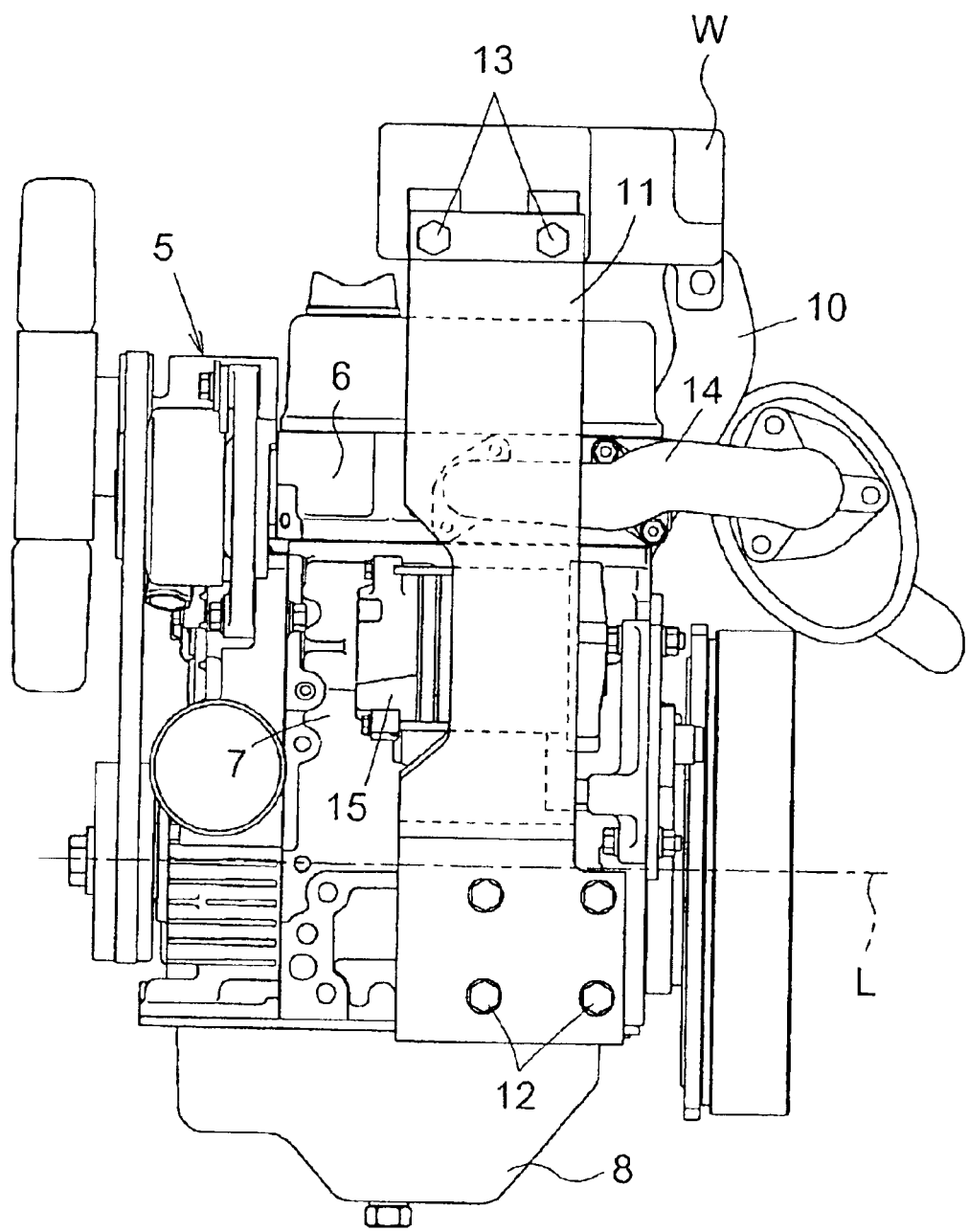
FIG. 3 is a side view of the engine mounting structure according to the first embodiment.

As illustrated in FIG. 1, an agricultural tractor exemplifying a vehicle comprises a vehicle body 2 having main frames 1 and the like, a right and left pair of front wheels 3 attached to a lower forward portion of the vehicle body 2, an unillustrated right and left pair of rear wheels attached to a lower rearward portion of the vehicle body 2, and a steering wheel 4 and an unillustrated driver's seat and the like mounted on the vehicle body 2.

A two-cylinder diesel engine 5, for example, is housed in vertical posture in an engine room provided forwardly of the vehicle body 2, with a cylinder head 6 disposed in an upper position of the engine and a crankcase 7 disposed in a lower position thereof. An oil pan 8 is provided below the crankcase 7. The engine 5 is arranged to have an axis of a crankshaft housed in the crankcase 7 extending horizontally in a longitudinal direction, and have the crankcase 7 mounted and supported on the main frames 1 through a total of four rubber cushions 9 acting as mounting elements.

In a vibration damping system according to a first embodiment of the present invention, as shown in FIGS. 1 through 5, a weight support unit includes a left weight support arm (first arm) 10 formed of sheet metal and disposed at the left side of the engine 5 as viewed from the driver's seat, and a right weight support arm (second arm) 11 disposed at the right side of the engine 5. The left weight support arm 10 is attached to a left side face of the crankcase 7 through a plurality of bolts 12, and the right weight support arm 11 to a right side face of the crankcase 7 through a plurality of bolts 12.

The left weight support arm 10 extends substantially vertically upward from the left side face of the crankcase 7 to a level above the cylinder head 6. The right weight support arm 11 bends and bulges outwardly from the right side face of the crankcase 7 to extend upwardly and substantially vertically upward therefrom to a level above the cylinder head 6.

A damping weight W is mounted between upper ends of the weight support arms 10 and 11 and fixed thereto through weight bolts 13. The damping weight W is supported by the crankcase 7 of the engine 5 through the weight support arms 10 and 11 to be positioned right over the cylinder head 6.

More particularly, the left weight support arm 10 extends upward from the crankcase 7 along the left side of the cylinder head 6, while the right weight support arm 11 extends upward from the crankcase 7 along the right side of the cylinder head 6. In other words, the right and left weight support arms 10 and 11 extend upward from the crankcase 7 along the opposite sides of the cylinder head 6, to maintain the damping weight W right over the cylinder head 6 and out of contact with the cylinder head 6.

The right weight support arm 11 bulges outwardly as noted above so that an exhaust manifold 14 and a starter motor 15 may be arranged inside the bulging portion of the right weight support arm 11.

Figure 4:
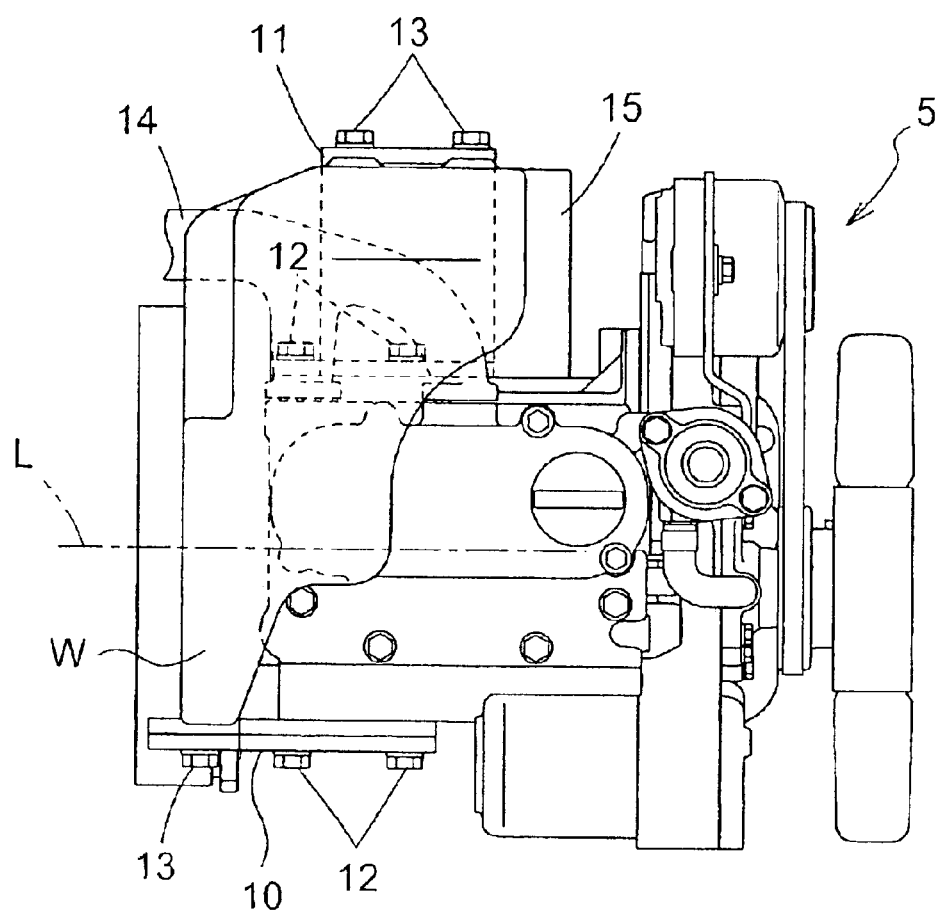
FIG. 4 is a top plan view of the engine mounting structure according to the first embodiment.
Figure 5:
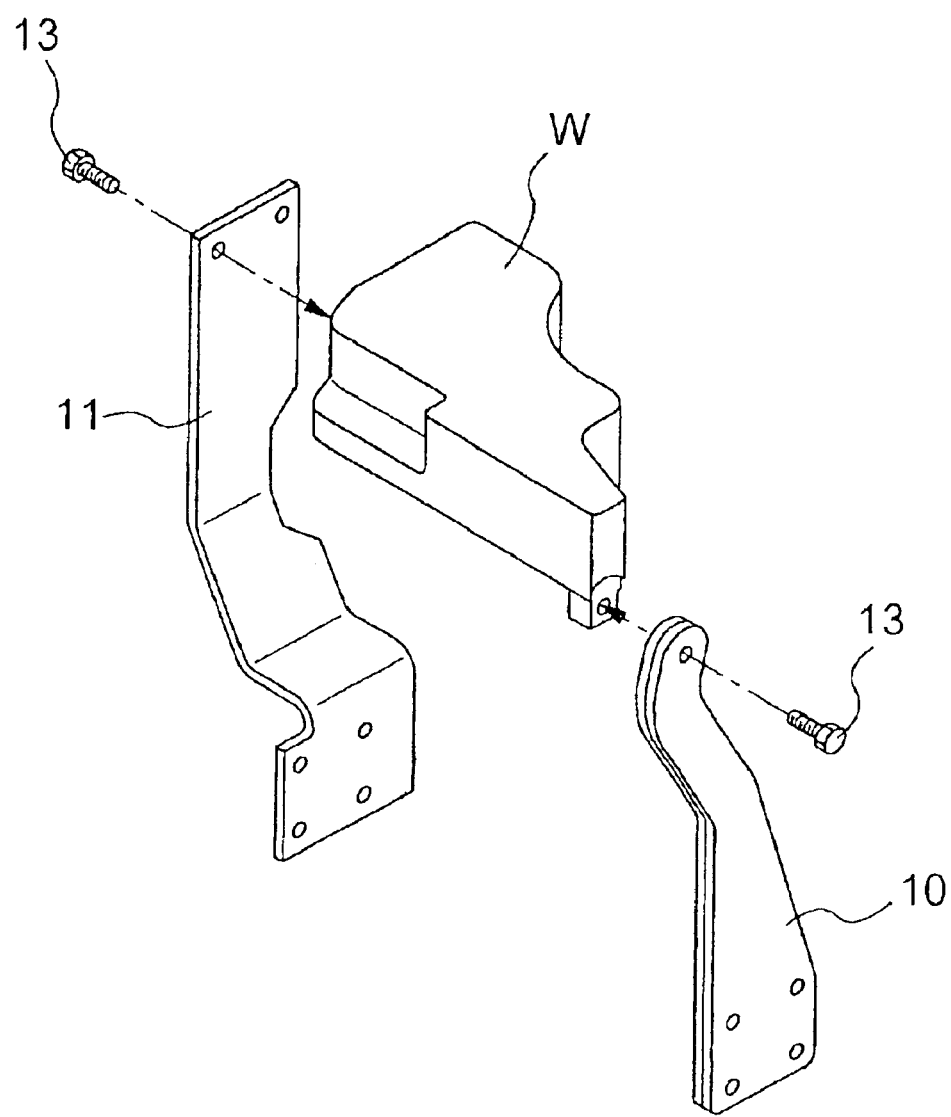
FIG. 5 is an exploded perspective view of a principal portion of the engine mounting structure according to the first embodiment.
Figure 6:
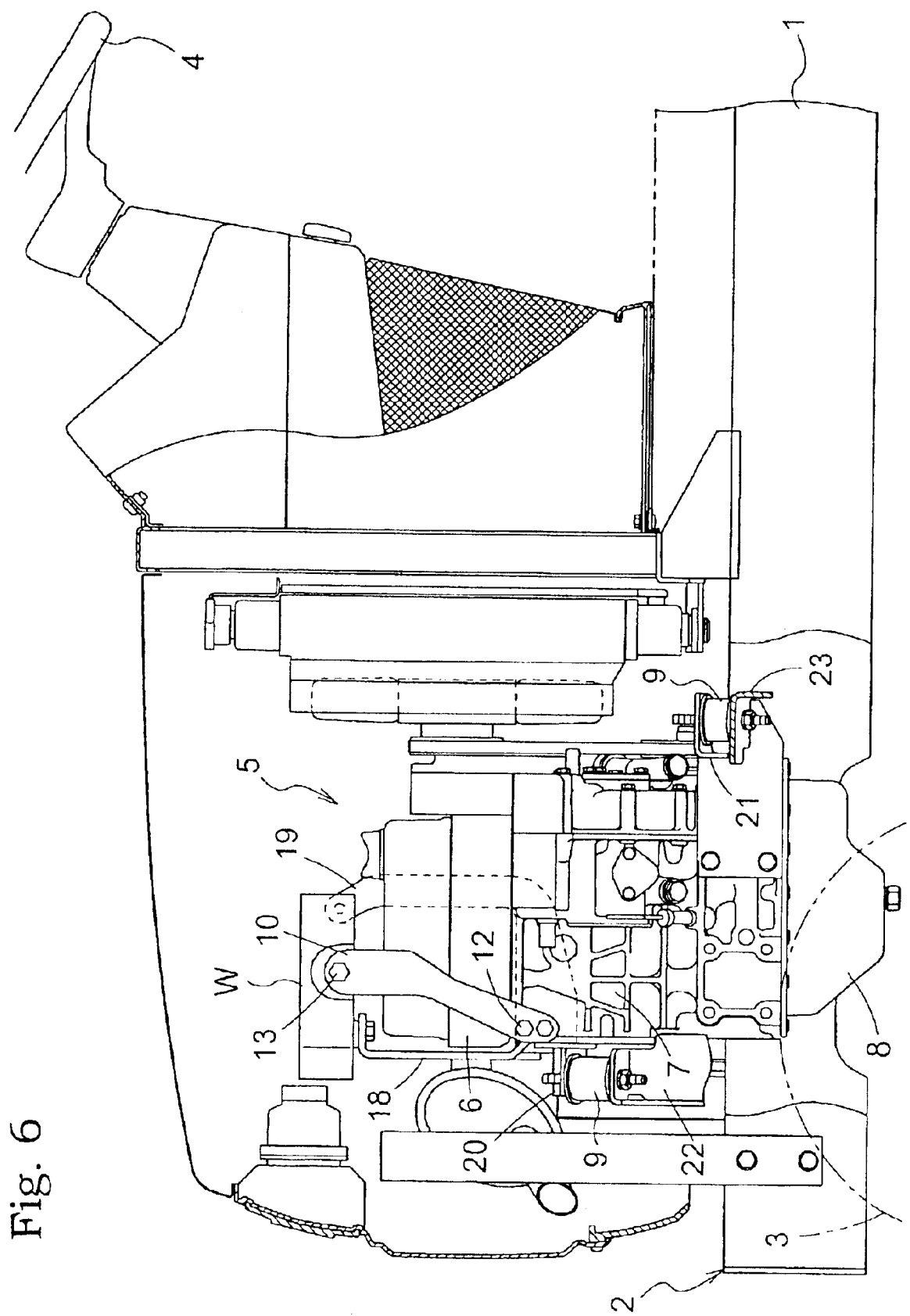
FIG. 6 is a side elevation of a principal portion of an agricultural tractor according to a second embodiment.

As apparent from FIG. 4, the right weight support arm 11 extends at one side of a vertical plane extending through the axis L of the crankshaft (a plane extending through the axis L and perpendicular to the plane of FIG. 4), while the left weight support arm 10 extends at the other side of the vertical plane. The damping weight W is attached to the free ends of these arms 10 and 11 and thus extends transversely across the vertical plane. The right and left weight support arms 10 and 11 are made of plate-like members each easily bendable in a direction transverse to the axis L of the crankshaft.

A second embodiment of the vibration damping system according to the present invention will be described next.

Like reference numerals are used to identify like parts which are the same as in the first embodiment and will not be described again to avoid unnecessary repetition. Thus, only the aspects different from the first embodiment will mainly be described.

According to the second embodiment, as shown in FIGS. 6 through 10, a weight support unit includes a base member 17, a left weight support arm (first arm) 10 formed of sheet metal and disposed at the left side of the engine 5 as viewed from the driver's seat, a front weight support arm 18 disposed forwardly of the engine 5, and an L-shaped right weight support arm (second arm) 19 disposed at the right side of the engine 5. The front weight support arm 18 and right weight support arm 19 are connected to the base member 17 to constitute a weight support subunit 16 together.

The left weight support arm 10 is attached to the left side face of the crankcase 7 through a plurality of bolts 12, while the front weight support arm 18 to the front face of the crankcase 7 through a plurality of bolts 12.

The left weight support arm 10 is slight different in shape from the left weight support arm 10 in the first embodiment, but is almost the same in function as that in the first embodiment, and extends substantially vertically upward from the left side face of the crankcase 7 to a position above the cylinder head 6 to hold a vibration damping weight W.

Figure 10:
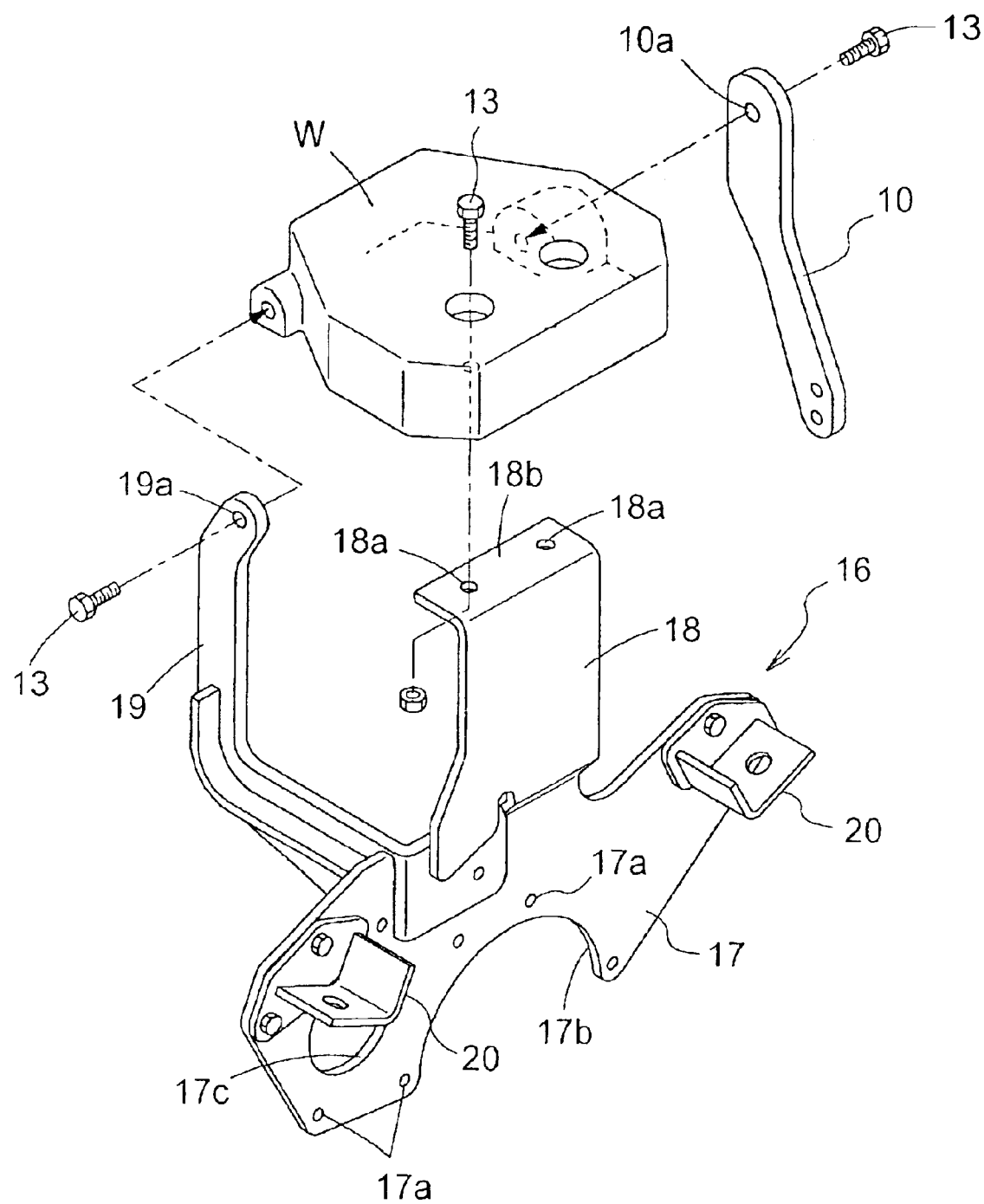
FIG. 10 is an exploded perspective view of a principal portion of the engine mounting structure according to the second embodiment.

The weight support subunit 16 includes, as shown in FIG. 10, the base member 17 provided forwardly of the engine 5, the front weight support arm 18 extending upward from the base member 17 to be positioned forwardly of the engine 5, and the L-shaped right weight support arm 19 extending upward and rearward from the base member 17 to be positioned at the right side of the engine 5.

The right weight support arm 19 corresponds to the right weight support arm 11 in the first embodiment. The right weight support arm 19 and front weight support arm 18 are welded to the base member 17 to be integral therewith to constitute the weight support subunit 16.

The base member 17 of the weight support subunit 16 defines bolt receiving bores 17a for receiving bolts 12 for attachment to the crankcase 7, a generally semicircular cutout 17b, and a circular aperture 17c. At right and left front side portions of the base member 17 are attached a right and left pair of rubber cushion (mounting element) brackets serving as receiving portions for the mounting elements.

The front weight support arm 18 is bent rearwardly at an upper end thereof. A plurality of bolt receiving bores 18a are formed in the bent portion 18b for attaching the damping weight W thereto. A bolt receiving bore 19a is formed in an upper end of the right weight support arm 19 for attaching the damping weight W.

The crankcase 7 of the engine 5 includes rubber cushion brackets 21 attached to rearward positions on opposite sides thereof. To the main frames 1 constituting the vehicle body 2 are attached a pair of forward brackets 22 and a pair of rearward brackets 23 corresponding to the pair of rubber cushion brackets 21 and the pair of rubber cushion brackets 20 noted above.

More particularly, when the weight support subunit 16 is attached to the crankcase 7 through the plurality of bolts 12, the forward brackets 22 correspond to the right and left pair of rubber cushion brackets 20 provided forwardly of the base member 17 while the rearward brackets 23 correspond to the rubber cushion brackets 21. Thus, rubber cushions 9 are provided between the rubber cushion brackets 20 and 21 attached to the engine 5 and the brackets 22 and 23 attached to the vehicle body. Through these rubber cushions 9 the engine 5 is mounted and maintained on the main frames 1.

According to the second embodiment, the damping weight W is attached through a plurality of weight bolts 13 utilizing the bolt receiving bores 18a formed in the front weight support arm 18, the bolt receiving bore 19a formed in the right weight support arm 19 and a bolt receiving bore 10a formed in an upper end of the left weight support arm 10. As a result, the damping weight W is maintained by the crankcase 7 of the engine 5 through the left weight support arm 10 and the front weight support arm 18 and the right weight support arm 19 of the weight support subunit 16, thereby to be positioned right over the cylinder head 6.

Figure 7:
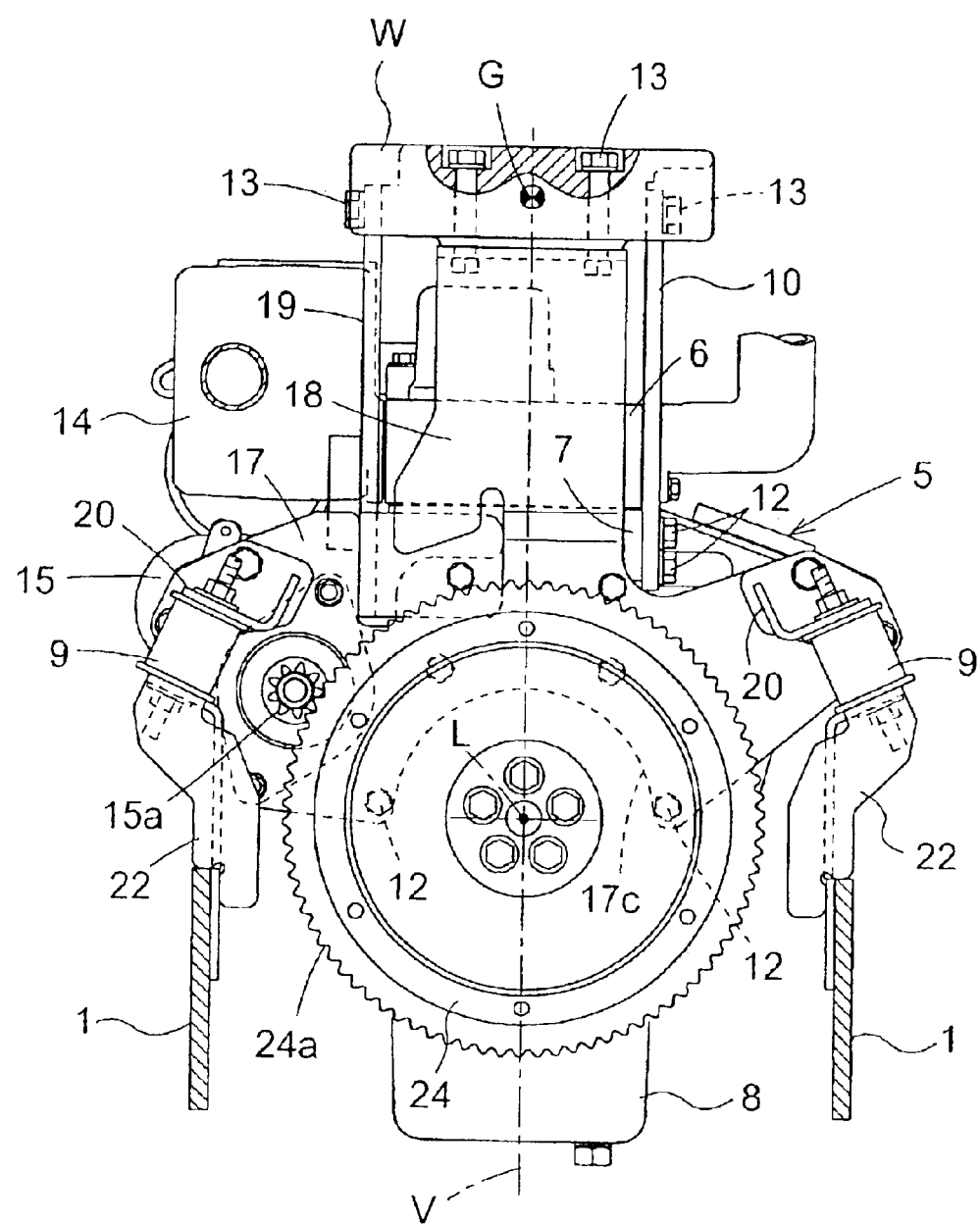
FIG. 7 is a front view of an engine mounting structure according to the second embodiment.
Figure 8:
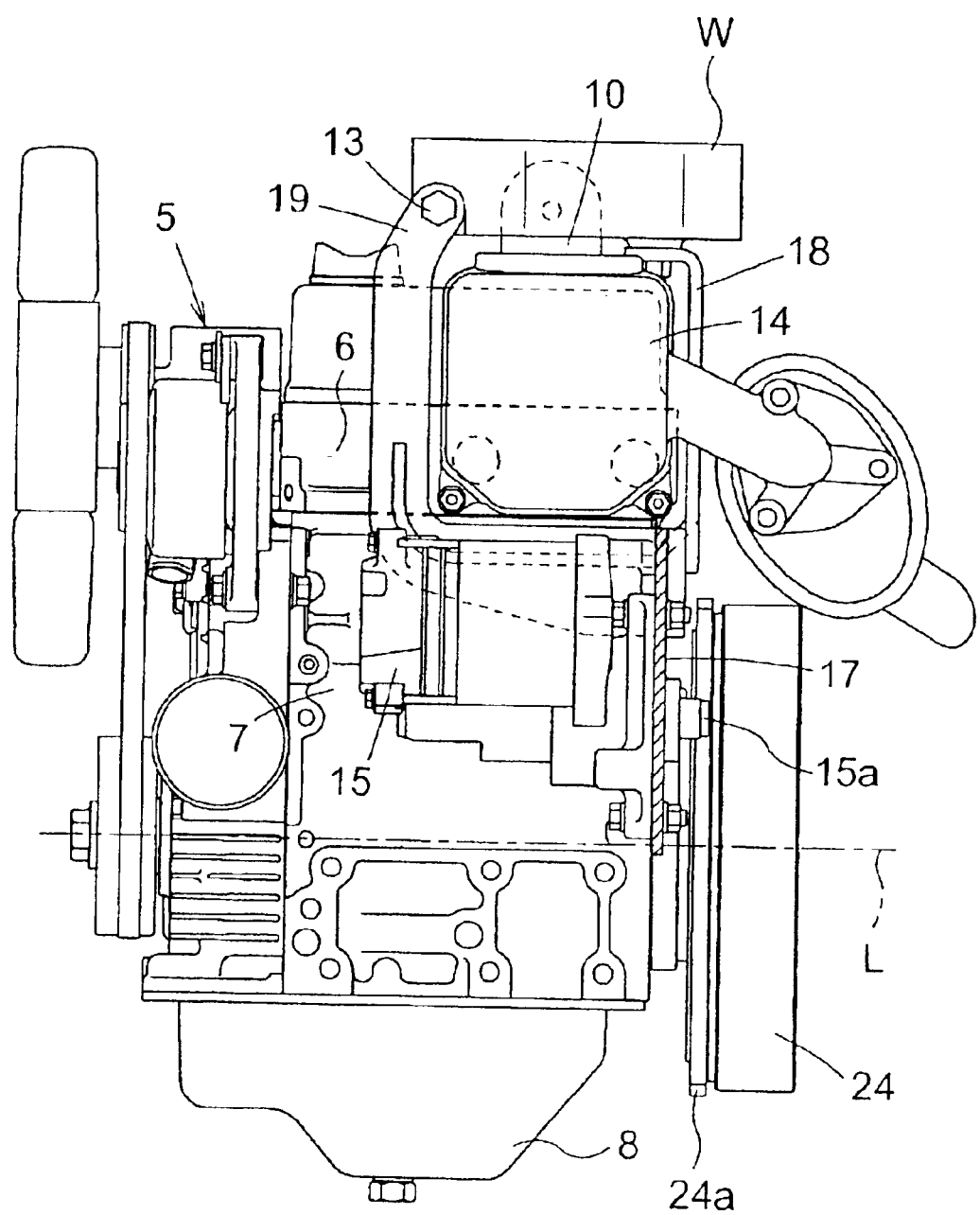
FIG. 8 is a side view of the engine mounting structure according to the second embodiment.
Figure 9:
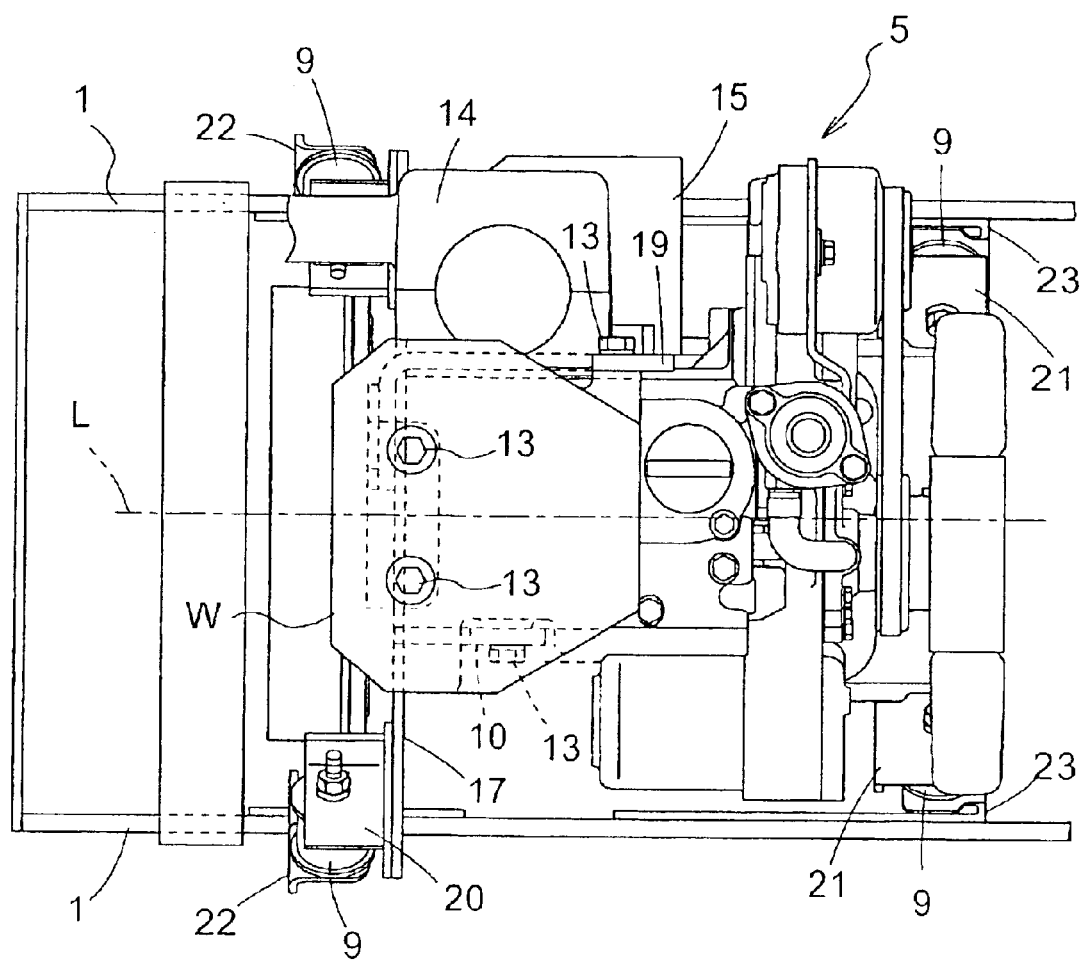
FIG. 9 is a top plan view of the engine mounting structure according to the second embodiment.

In order words, according to the second embodiment, the left weight support arm 10 and the right weight support arm 19 of the weight support subunit 16 extend from the crankcase 7 upward along the opposite sides of the cylinder head 6 to maintain the damping weight W right over the cylinder head 6. Further, the front weight support arm 18 of the weight support subunit 16 extends upward along the front of the engine 5 to maintain the damping weight W out of contact with the cylinder head 6. The damping weight W maintained in this state, as shown in FIG. 7, has its center of gravity G located on and adjacent a vertical plane V extending through the axis L of the crankshaft as viewed in the direction of axis L.

The weight support subunit 16 acts also as a mounting bracket for a starter motor 15. More particularly, the starter motor 15 is attached to the circular aperture 17c formed in the base member 17, and a starter gear 15a of the starter motor 15 is meshed with a large-diameter gear 24a of a flywheel 24.

The right weight support arm 19 of the weight support subunit 16 is L-shaped as noted above and thus defines an opening space at the right side of the engine 5 where an exhaust manifold 14 is provided.

[Alternative Embodiments]

(1) In the foregoing embodiments, the weight support unit maintains the vibration damping weight W right over the cylinder head 6. Instead, the damping weight W may be maintained forwardly or laterally of the cylinder head 6. In any case, a desired effect can be expected as long as the weight is arranged in the proximity of the cylinder head 6.

The damping weight W is maintained by the crankcase 7 of the engine 5 in the above-described embodiments. Instead, the damping weight W may be maintained by the cylinder head 6 or the oil pan 8.

(2) In the first embodiment, the weight support unit includes two arms, i.e. the left weight support arm 10 and the right weight support arm 11. In the second embodiment, the weight support unit includes three arms, i.e. the left weight support arm 10, the front weight support arm 18 and the right weight support arm 19. The specific construction of the weight support unit may be varied in many ways, e.g. the plurality of supporting arms being integrated into a unit or maintaining the damping weight W in a cantilever mode.

(3) The first and second embodiments show an agricultural tractor by way of example of the vehicle. Instead, the present invention may be applied to various vehicles including construction and building vehicles. Also, the engine to be mounted on the vehicle is not limited to a diesel engine, and the number of cylinders is not limited to two.

What is claimed is:

1. A vibration damping system for an engine mounted on a vehicle, the system comprising:
    mounting elements attached to a frame of the vehicle, through which elements the engine is mounted on the frame;
    a damping weight provided outwardly of the engine; and
    a weight support unit fixed at one end thereof to the engine and having the damping weight supported to the other end thereof at a location spaced apart from the one end and outwardly of the engine, wherein the weight support unit includes a first arm extending along one lateral side of a vertical plane extending through an axis of a crankshaft, and a second arm extending along the other lateral side of the vertical plane, the damping weight being attached to free ends of the arms to extend transversely of the vertical plane.

2. A vibration damping system as claimed in claim 1, wherein the first and second arms each includes a plate portion having a section easily bendable in a direction transverse to an extending direction of the crankshaft.

3. A vibration damping system as claimed in claim 1, wherein the damping weight is arranged at a higher level than the engine.

4. A vibration damping system for an engine mounted on a vehicle, the system comprising:
    mounting elements attached to a frame of the vehicle, through which elements the engine is mounted on the frame with a cylinder head disposed in an upper position of the engine and a crankcase disposed in a lower position thereof;
    a damping weight supported by the engine to be located adjacent the cylinder head and the damping weight being supported by a weight support unit fixed at one end thereof to the engine;
    wherein the weight support unit includes a first arm extending along one lateral side of the cylinder head and a second arm extending along the other lateral side of the cylinder head, the damping weight being maintained above the cylinder held by the first and second arms.

5. A vibration damping system as claimed in claim 4, wherein the weight support unit includes brackets for the mounting elements.

6. A vibration damping system as claimed in claim 4, wherein the damping weight is disposed to have a center of gravity located in or adjacent a vertical plane extending through an axis of a crankshaft.

7. A vibration damping system as claimed in claim 4, wherein the damping weight is shaped such that it is non-symmetric with respect to a crank axis of the engine in plan view.

8. An engine supported on a frame of a vehicle and a vibration damping system therefor, comprising:
    an engine;
    mounting elements attached to a frame of the vehicle, through with elements the engine is mounted on the frame with a cylinder head disposed in an upper position of the engine and a crankcase disposed in a lower position thereof;
    a damping weight supported by the engine to be located adjacent the cylinder head and the damping weight being supported by a weight support unit fixed at one end thereof to the engine;
    wherein the weight support unit includes a first arm extending along one lateral side of the cylinder head wherein the damping weight being maintained above the cylinder head by the weight support unit.

9. A vibration damping system as claimed in claim 8, wherein the weight support arm extending along the other lateral side of the cylinder head such that the damping weight extends through a vertical plane extending through an axis of a crankshaft of the engine.

10. A vibration damping system as claimed in claim 8, wherein the weight support unit includes the first arm extending along one lateral side of the cylinder head and a second arm extending along the other lateral side of the cylinder head, the damping weight being maintained above the cylinder head by the first and second arms.

11. A vibration damping system as claimed in claim 8, wherein the damping weight is disposed to have a center of gravity located in or adjacent a vertical plane extending through an axis of a crankshaft.

12. A vibration damping system as claimed in claim 8, wherein the damping weight is shaped such that it is non-symmetric with respect to a crank axis of the engine in plan view.

* * * * *

UNITED STATES PATENT AND TRADEMARK OFFICE
CERTIFICATE OF CORRECTION

PATENT NO.    : 6,959,780 B2  
DATED         : November 1, 2005  
INVENTOR(S)   : Oshima et al.

It is certified that error appears in the above-identified patent and that said Letters Patent is hereby corrected as shown below:

Column 6,  
Line 34, "cylinder held" should read -- cylinder head --.  
Line 51, "through with" should read -- through which --.  
Line 61, "head wherein the damping" should read -- head, the damping --.  
Line 64, "support arm extending" should read -- support unit further includes a second arm extending --.

Signed and Sealed this

Second Day of May, 2006

JON W. DUDAS  
*Director of the United States Patent and Trademark Office*